United States Patent
Resconi et al.

(10) Patent No.: US 8,785,575 B2
(45) Date of Patent: Jul. 22, 2014

(54) PROCESS FOR THE PREPARATION OF ETHYLENE PROPYLENE COPOLYMERS

(75) Inventors: Luigi Resconi, Ferrara (IT); Francesca Focante, Filottrano (IT)

(73) Assignee: Basell Polyolefine GmbH, Wesseling (DE)

(*) Notice: Subject to any disclaimer, the term of this patent is extended or adjusted under 35 U.S.C. 154(b) by 747 days.

(21) Appl. No.: 12/226,385

(22) PCT Filed: Apr. 6, 2007

(86) PCT No.: PCT/EP2007/053424
§ 371 (c)(1),
(2), (4) Date: Dec. 22, 2008

(87) PCT Pub. No.: WO2007/122097
PCT Pub. Date: Nov. 1, 2007

(65) Prior Publication Data
US 2009/0198027 A1    Aug. 6, 2009

Related U.S. Application Data

(60) Provisional application No. 60/797,362, filed on May 3, 2006.

(30) Foreign Application Priority Data

Apr. 21, 2006 (EP) .................................. 06112927

(51) Int. Cl.
C08F 4/6592 (2006.01)
C08F 4/642 (2006.01)
C08F 210/02 (2006.01)
C08F 210/06 (2006.01)

(52) U.S. Cl.
USPC ............ 526/160; 526/165; 526/348; 526/943

(58) Field of Classification Search
CPC .... C08F 4/6592; C08F 4/6428; C08F 210/02; C08F 210/06
USPC .................................. 526/160, 165, 348, 943
See application file for complete search history.

(56) References Cited

U.S. PATENT DOCUMENTS

| | | | |
|---|---|---|---|
| 5,610,254 A | 3/1997 | Sagane et al. | |
| 5,698,487 A | 12/1997 | Sacchetti et al. | |
| 6,399,533 B2 | 6/2002 | Sacchetti et al. | |
| 6,423,660 B1 | 7/2002 | Albizzati et al. | |
| 6,444,604 B1 | 9/2002 | Albizzati et al. | |
| 6,492,539 B1 | 12/2002 | Bingel et al. | |
| 6,559,252 B1 | 5/2003 | Horton et al. | |
| 6,608,224 B2 | 8/2003 | Resconi et al. | |
| 6,774,194 B2 | 8/2004 | Albizzati et al. | |
| 6,841,501 B2 | 1/2005 | Resconi et al. | |
| 6,878,786 B2 | 4/2005 | Resconi et al. | |
| 6,953,829 B2 | 10/2005 | Kratzer et al. | |
| 6,963,017 B2 | 11/2005 | Bingel et al. | |
| 7,038,070 B2 | 5/2006 | Bingel et al. | |
| 7,053,160 B1 | 5/2006 | Bingel et al. | |
| 7,101,940 B2 | 9/2006 | Schottek et al. | |
| 7,109,278 B2 | 9/2006 | Okumura et al. | |
| 7,141,527 B1 | 11/2006 | Van Baar et al. | |
| 7,157,591 B2 | 1/2007 | Burkhardt et al. | |
| 7,163,907 B1 | 1/2007 | Canich et al. | |
| 7,314,903 B2 | 1/2008 | Resconi et al. | |
| 7,417,006 B2 | 8/2008 | Resconi et al. | |
| 7,452,949 B2 | 11/2008 | Okumura et al. | |
| 2006/0052553 A1* | 3/2006 | Resconi et al. | ............... 526/127 |

(Continued)

FOREIGN PATENT DOCUMENTS

DE  19962814  6/2001
DE  19962910  7/2001

(Continued)

OTHER PUBLICATIONS

L. Resconi et al., "Selectivity in Propene Polymerization with Metallocene Catalysts;" Chem. Rev., vol. 100(4), p. 1253-1345 (2000).
C. Carman et al., "Monomer Sequence Distribution in Ethylene-Propylene Rubber Measured by $^{13}$C NMR. 3. Use of Reaction Probability Model," Macromolecules, vol. 10(3), p. 536-544 (1977).
M. Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," Macromolecules, vol. 15(4), p. 1150-1152 (1982).
I. Tritto et al., "$^{13}$C NMR Studies of Ethylene-Propylene Copolymers Prepared with Homogeneous Metallocene-Based Ziegler-Natta Catalysts," Macromolecules, vol. 28(9), p. 3342-3350 (1995).
J. Randall, "A Review of High Resolution Liquid $^{13}$Carbon Nuclear Magnetic Resonance Characterizations of Ethylene-Based Polymers," JMS-Rev. Macromol. Chem. Phys., vol. C29(2&3), p. 201-317 (1989).

*Primary Examiner* — Caixia Lu

(57) ABSTRACT

A polymerization process comprising contacting under polymerization conditions ethylene and at least propylene to obtain a copolymer containing from 96% by mol to 71% by mol of ethylene derived units, in the presence of a catalyst system obtainable by contacting: b) at least a metallocene compound of formula (I), b) alumoxane or a compound capable of forming an alkyl metallocene cation; and optionally c) an organo aluminum compound; wherein the groups $R^1$-$R^4$, L, M and W are described in the text.

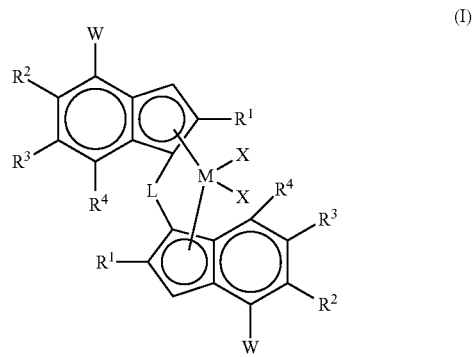

10 Claims, No Drawings

(56) References Cited

U.S. PATENT DOCUMENTS

| | | | |
|---|---|---|---|
| 2007/0276095 | A1 | 11/2007 | Resconi et al. |
| 2008/0281062 | A1 | 11/2008 | Resconi et al. |
| 2008/0319135 | A1 | 12/2008 | Resconi et al. |
| 2009/0062491 | A1 | 3/2009 | Nifant'ev et al. |

FOREIGN PATENT DOCUMENTS

| | | |
|---|---|---|
| EP | 633272 | 1/1995 |
| EP | 718324 | 6/1996 |
| WO | 961/02012 | 2/1991 |
| WO | 92/00333 | 1/1992 |
| WO | 95/32995 | 12/1995 |
| WO | 98/40331 | 9/1998 |
| WO | 99/21899 | 5/1999 |
| WO | 00/31090 | 6/2000 |
| WO | 01/21674 | 3/2001 |
| WO | 01/62764 | 8/2001 |
| WO | 02/102811 | 12/2002 |
| WO | 03/045551 | 6/2003 |
| WO | 03/050131 | 6/2003 |
| WO | 2004/005360 | 1/2004 |
| WO | WO 2004/050724 * | 6/2004 |
| WO | 2005/023889 | 3/2005 |
| WO | 2005/058916 | 6/2005 |
| WO | 2005/095468 | 10/2005 |
| WO | 2006/008211 | 1/2006 |
| WO | 2006/097497 | 9/2006 |
| WO | 2006/097500 | 9/2006 |
| WO | 2006/120177 | 11/2006 |
| WO | 2007/122098 | 11/2007 |

* cited by examiner

PROCESS FOR THE PREPARATION OF ETHYLENE PROPYLENE COPOLYMERS

The present invention relates to a process for the preparation of ethylene propylene copolymers wherein the process is carried out in the presence of a metallocene based catalyst system having a particular substitution pattern.

WO 03/050131 describes a class of bridged bis indenyl metallocene compounds wherein the indenyl moieties are substituted at least in positions 2, 4 and 5. In this document about 100 pages are used to list example of compounds included in the general formula, all these compounds are bridged bis indenyl metallocene compounds substituted in positions 2, 4 and 5. WO 03/050131 states that this class of metallocene compounds can be used for every kind of polymerization process including solution polymerizations, however all the examples are directed to slurry polymerization process.

PCT/EP2004/013827 a class of bis indenyl metallocene compounds wherein the indenyl moieties are substituted in position 5 and 6 by a condensed ring is disclosed. PCT/EP2004/013827 is mainly focused on $C_1$ symmetric structures and there are no explicit disclosures of $C_2$ symmetric compounds. In other words this document is focused on metallocene compounds comprising two cyclopentadienyl moieties having different substitution patterns.

EP 05103955.0 relates to a solution polymerization process for the preparation of propylene/ethylene copolymers. This document is silent about the preparation of ethylene higher alpha olefins copolymers.

The applicant found that by using a metallocene-based catalyst system wherein the metallocene compound has a particular substitution patter it is possible to obtain ethylene based copolymers in high yields wherein the copolymers are endowed with a very high molecular weight.

An object of the present invention is a polymerization process comprising contacting under polymerization conditions ethylene and at least propylene to obtain a copolymer containing from 96% by mol to 71% by mol of ethylene derived units in the presence of a catalyst system obtainable by contacting:

a) at least a metallocene compound of formula (I)

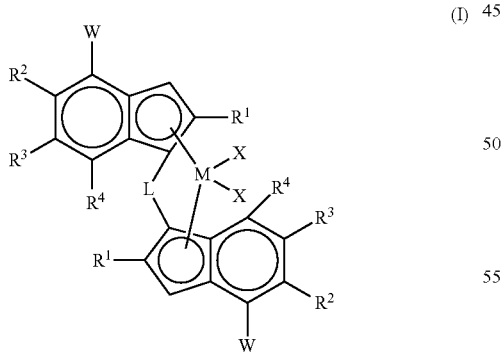

(I)

b) an alumoxane or a compound capable of forming an alkyl metallocene cation; and optionally
c) an organo aluminum compound;
wherein in the metallocene compound of formula (I):
M is an atom of a transition metal selected from those belonging to group 3, 4, or to the lanthanide or actinide groups in the Periodic Table of the Elements; preferably M is zirconium, titanium or hafnium;

X, equal to or different from each other, is a hydrogen atom, a halogen atom, a R, OR, OR'O, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical; L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; preferably L is $Si(R^{11})_2$ wherein $R_{11}$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; more preferably L is $Si(CH_3)_2$ or $SiPh_2$;

$R_1$ is a linear $C_1$-$C_{40}$ hydrocarbon radical optionally containing heteroatoms belonging to groups 13-17 of the Periodic Table of the Elements such as methyl or ethyl radical or an alpha branched aryl or arylalkyl radical containing from 2 to 20 carbon atoms optionally containing O, N, S, P and Se atoms, in particular O, N and S atoms such as 2(5-Me-thiophenyl) or 2(5-Me-furanyl) radicals; preferably $R_1$ is a linear $C_1$-$C_{20}$-alkyl, $C_2$-$C_{40}$ alkenyl, $C_2$-$C_{40}$ alkynyl radical, optionally containing heteroatoms belonging to groups 13-17 of the Periodic Table of the Elements; preferably $R_1$ is a linear $C_1$-$C_{10}$-alkyl radical; more preferably $R_1$ is a methyl, or ethyl radical;

$R_2$ and $R_3$, equal to or different from each other, are $C_1$-$C_{40}$ hydrocarbon radicals optionally containing heteroatoms belonging to groups 13-17 of the Periodic Table of the Elements or $R_2$ and $R_3$, are part of 4-7 membered ring condensed to the benzene ring of the indenyl moiety said ring optionally containing heteroatoms belonging to groups 13-17 of the Periodic Table of the Elements; the valence of each atom forming said ring being substituted with $R_{18}$ radicals; that means that it is filled with $R_{18}$ groups, wherein $R_{18}$, equal to or different from each other, are hydrogen atoms or a $C_1$-$C_{20}$ hydrocarbon radical; preferably $R_{18}$ is a hydrogen atom or a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radical, optionally containing one or more heteroatoms belonging to groups 13-17 of the Periodic Table of the Elements; more preferably $R_{18}$ is a hydrogen atom or a linear or branched, $C_1$-$C_{20}$-alkyl radical; more preferably $R_{18}$ is a hydrogen atom or a methyl or ethyl radical; said ring can be saturated or it can contain double bonds; preferably $R_2$ and $R_3$, equal to or different from each other, are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical optionally containing heteroatoms belonging to groups 13-17 of the Periodic Table of the Elements or $R_2$ and $R_3$ are part of a 5 or 6 membered ring; said ring optionally containing heteroatoms belonging to groups 13-16 of the Periodic Table of the Elements preferably groups 15-16 of the Periodic Table of the Elements; the valence of each atom forming said ring being substituted with $R^{18}$ radicals; as described above; preferably $R^2$ and $R^3$, are $C_1$-$C_{20}$ alkyl radicals or form together a condensed saturated 3-7 membered ring;

$R^4$ is a hydrogen atom or a $C_1$-$C_{40}$ hydrocarbon radical optionally containing heteroatoms belonging to groups 13-17 of the Periodic Table of the Elements; preferably $R^4$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical optionally containing heteroatoms belonging to groups 13-17 of the Periodic Table of the Elements; preferably $R^4$ is a hydrogen atom a $C_1$-$C_{10}$-alkyl or a $C_6$-$C_{40}$-aryl radical;

W is an aromatic 5 or 6 membered ring that can contain heteroatoms belonging to groups 15-16 of the Periodic Table of the Elements; the valence of each atom of said ring is substituted with hydrogen atom or it can optionally be substituted with $R^5$ groups, wherein $R^5$, equal to or different from each other, are $C_1$-$C_{40}$ hydrocarbon radicals optionally containing heteroatoms belonging to groups 13-17 of the Periodic Table of the Elements; preferably $R^5$, are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements;

Preferably W is selected from the group comprising the following moieties of formula (Wa), (Wb) and (Wc):

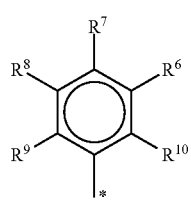

(Wa)

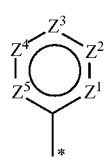

(Wb)

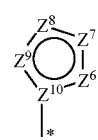

(Wc)

wherein the * represents the point in which the moiety bounds the indenyl moiety of the compound of formula (I);

$R^6$, $R^7$, $R^8$, $R^9$ and $R^{10}$, equal to or different from each other, are hydrogen atoms or $C_1$-$C_{40}$ hydrocarbon radicals optionally containing heteroatoms belonging to groups 13-17 of the Periodic Table of the Elements; preferably $R^6$, $R^7$, $R^8$, $R^9$ and $R^{10}$, are hydrogen atoms or linear or branched, cyclic or acyclic, $C_1$-$C_{40}$-allyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements;

$Z^1$ is a nitrogen atom or a $CR^{10}$ group; $Z^2$ is a nitrogen atom or a $CR^6$ group; $Z^3$ is a nitrogen atom or a $CR^7$ group; $Z^4$ is a nitrogen atom or a $CR^8$ group; $Z^1$ is a nitrogen atom or a $CR^9$ group; provided that not more that 2 groups among $Z^1$, $Z^2$, $Z^3$, $Z^4$ and $Z^5$ are nitrogen atoms, preferably not more that one group among $Z^1$, $Z^2$, $Z^3$, $Z^4$ and $Z^5$ is a nitrogen atom;

$Z^6$ is an oxygen atom, a sulfur atom, a $NR^{13}$ group or a $CR^{13}$ group; $Z^7$ is an oxygen atom, a sulfur atom, a $NR^{14}$ group or a $CR^{14}$ group; $Z^8$ is an oxygen atom, a sulfur atom, a $NR^{15}$ group or a $CR^{15}$ group; $Z^9$ is an oxygen atom, a sulfur atom, a $NR^{16}$ group or a $CR^{16}$ group;

$Z^{10}$ is a nitrogen atom or a carbon atom that bonds the indenyl moiety of the structure of formula (I); with the proviso that not more than 1 group among $Z^6$, $Z^7$, $Z^8$, $Z^9$ or $Z^{10}$ is a sulfur atom, an oxygen atom or a nitrogen-containing group atom selected from $NR^{13}$, $NR^{14}$, $NR^{15}$, $NR^{16}$, and a nitrogen atom;

$R^{13}$, $R^{14}$, $R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements; preferably $R^6$, $R^7$, $R^8$, $R^9$ and $R^{10}$, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^6$, $R^7$, $R^8$, $R^9$ and $R^{10}$ are hydrogen atoms, $C_1$-$C_{40}$-alkyl or $C_6$-$C_{40}$-aryl radicals;

In the moiety of formula (Wa), in a preferred embodiment, $R^7$ is a $C_1$-$C_{40}$-alkyl radical, preferably a branched $C_1$-$C_{40}$-alkyl radical such as a tertbutyl radical, more preferably $R^7$ is a branched $C_1$-$C_{40}$-alkyl radical wherein the carbon atom in position alpha is a tertiary carbon atom and $R^6$, $R^8$, $R^9$ and $R^{10}$ are hydrogen atoms;

in a further preferred embodiment $R^{10}$ and $R^8$ are $C_1$-$C_{40}$-alkyl radicals, preferably they are linear $C_1$-$C_{40}$ alkyl radicals such as methyl radicals and $R^7$ and $R^9$ are hydrogen radicals; in a further preferred embodiment $R^6$, $R^7$ and $R^8$ are linear or branched $C_1$-$C_{40}$-alkyl radicals such as methyl or tertbutyl radicals and $R^{10}$ and $R^9$ are hydrogen atoms;

in a further preferred embodiment $R^6$, $R^7$, $R^8$, $R^9$ and $R^{10}$ are hydrogen atoms;

in the moiety of formula (Wb), in a preferred embodiment, $Z^1$ is a nitrogen atom and $Z^2$, $Z^3$, $Z^4$ and $Z^5$ are respectively $CR^6$, $CR^7$, $CR^8$ and $CR^9$ wherein the meaning of $R^6$, $R^7$, $R^8$, and $R^9$ is described above; in a further preferred embodiment $Z^3$ is a nitrogen atom and $Z^1$, $Z^2$, $Z^4$ and $Z^5$ are respectively $CR^{10}$, $CR^6$, $CR^8$ and $CR^9$ wherein the meaning of $R^{10}$, $R^6$, $R^8$, and $R^9$ is described above; in a further preferred embodiment $Z^2$ is a nitrogen atom and $Z^1$, $Z^3$, $Z^4$ and $Z^5$ are respectively $CR^{10}$, $CR^7$, $CR^8$ and $CR^9$ wherein the meaning of $R^{10}$, $R^7$, $R^8$, and $R^9$ is described above;

in the moiety of formula (Wc) in a preferred embodiment $Z^6$ is an oxygen atom, a sulfur atom, a $NR^{16}$ group; preferably it is a sulfur atom or a $NR^{16}$; wherein $R^{16}$ is preferably a $C_1$-$C_{40}$-alkyl radical; more preferably $Z^6$ is a sulfur atom; and $Z^7$, $Z^8$, $Z^9$ and $Z^{10}$ are respectively a $CR^{14}$, $CR^{15}$, $CR^{16}$ and a carbon atom, wherein $R^{14}$ is a hydrogen atom or a $C_1$-$C_{40}$- alkyl radical such as methyl or ethyl; and $R^{15}$ and $R^{16}$ are hydrogen atoms or $C_1$-$C_{40}$-alkyl radicals.

A further preferred class of compounds of formula (I) has formula (IIa), (IIb), or (IIc):

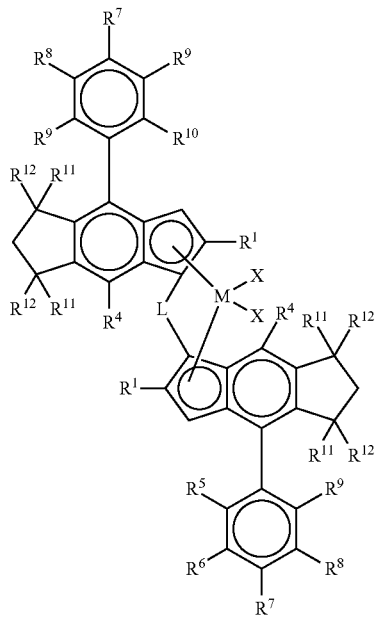

(IIa)

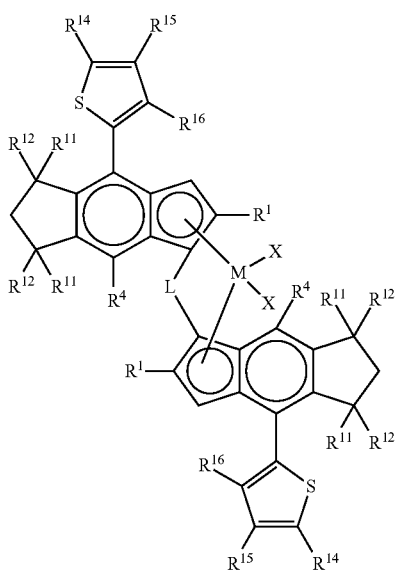

(IIb)

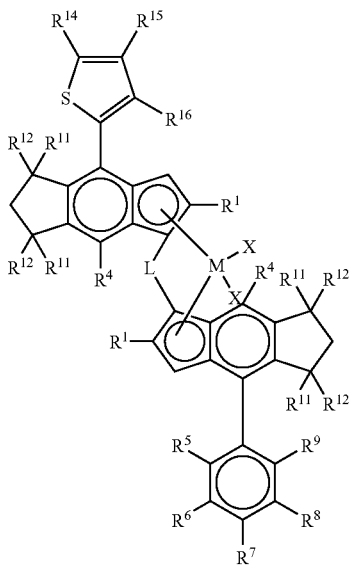

(IIc)

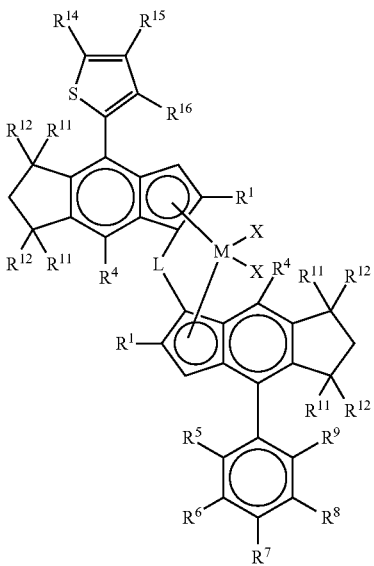

(IIc)

Wherein M, L, X, $R^1$, $R^4$, $R^6$, $R^7$, $R^8$, $R^9$ and $R^{10}$ have the meaning reported above and $R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements; preferably $R^{11}$ and $R^{12}$ are hydrogen atoms or linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements; more preferably $R^{11}$ and $R^{12}$ are hydrogen atoms or $C_1$-$C_{10}$-alkyl radicals such as methyl or ethyl radicals.

Preferably the metallocene compounds of formula (I) have $C_2$ symmetry. Metallocene symmetry classes can be found on Resconi et al. Chemical Reviews, 2000, Vol. 100, No. 4 1263 and references herein cited.

Preferably the metallocene compounds to be used in the process of the present invention are in their racemic(rac) or racemic-like form. Racemic(rac) and racemic-like form are described in PCT/EP2005/052688.

Examples of compounds having formula (I) are as follows
Me₂Si(6-Me-4-Ph-1,2,3,5-tetrahydro-s-indacen-7-yl)₂ZrCl₂,
Me₂Si(6,8-Me2-4-Ph-1,2,3,5-tetrahydro-s-indacen-7-yl)₂ZrCl₂,
Me₂Si[6-Me-4-(4-t-BuPh)-1,2,3,5-tetrahydro-s-indacen-7-yl]₂ZrCl₂,
Me₂Si(6,8-Me2-4-(4-t-BuPh)-1,2,3,5-tetrahydro-s-indacen-7-yl)₂ZrCl₂,
Me₂Si[6-Me-4-(2-MePh)-1,2,3,5-tetrahydro-s-indacen-7-yl]₂ZrCl₂,
Me₂Si(6,8-Me2-4-(2-MePh)-1,2,3,5-tetrahydro-s-indacen-7-yl)₂ZrCl₂,
Me₂Si(1,1,3,3,6-Me5-4-(2-MePh)-1,2,3,5-tetrahydro-s-indacen-7-yl)₂ZrCl₂,
Me₂Si[6-Me-4-(2,5-Me2Ph)-1,2,3,5-tetrahydro-s-indacen-7-yl]₂ZrCl₂,
Me₂Si[6-Me-4-(4-biphenyl)-1,2,3,5-tetrahydro-s-indacen-7-yl]₂ZrCl₂,
Me₂Si(1,1,3,3,6-Me5-4-Ph-1,2,3,5-tetrahydro-s-indacen-7-yl)₂ZrCl₂,
Me₂Si[1,1,3,3,6-Me5-4-(4-tBuPh)-1,2,3,5-tetrahydro-s-indacen-7-yl]₂ZrCl₂,
Me₂Si(2,2,6-Me3-4-Ph-1,2,3,5-tetrahydro-s-indacen-7-yl)₂ZrCl₂,
Me₂Si(2-Me-4-Ph-1H-cyclopenta[b]naphthalen-1-yl)₂ZrCl₂,
Me2Si(2,5,8-Me3-4-Ph-1H-cyclopenta[b]naphthalen-1-yl)₂ZrCl₂,
Me₂Si(2-Me-4-Ph-5,6,7,8-tetrahydro-1H-cyclopenta[b]naphthalen-1-yl)₂ZrCl₂,
Me₂Si(2,6-Me2-4-Ph-5H-1-thia-s-indacen-7-yl)₂ZrCl₂,
Me₂Si(2,3,6-Me3-4-Ph-5H-1-thia-s-indacen-7-yl)₂ZrCl₂,
Me₂Si(2,6-Me2-4-(4-t-BuPh)-5H-1-thia-s-indacen-7-yl)₂ZrCl₂,
Me₂Si(2,3,6-Me3-4-(4-t-BuPh)-5H-1-thia-s-indacen-7-yl)₂ZrCl₂,
Me₂Si(2-Me-4-Ph-1,5,6,7,8,9-hexahydrocyclohepta[f]inden-1-yl)₂ZrCl₂,
Me₂Si(6-Me-4-(2-benzothiophenyl)-1,2,3,5-tetrahydro-s-indacen-7-yl)₂ZrCl₂,
Me₂Si(6-Me-4-(2-(5-methylthiophenyl))-1,2,3,5-tetrahydro-s-indacen-7-yl)₂ZrCl₂,
Me₂Si(6-Me-4-(2-(5-methylfuryl))-1,2,3,5-tetrahydro-s-indacen-7-yl)₂ZrCl₂,
Me₂Si(6-Me-4-(4-pyridyl)-1,2,3,5-tetrahydro-s-indacen-7-yl)₂ZrCl₂,
C₂H₄(6-Me-4-Ph-1,2,3,5-tetrahydro-s-indacen-7-yl)₂ZrCl₂,
C₂H₄(6,8-Me2-4-Ph-1,2,3,5-tetrahydro-s-indacen-7-yl)₂ZrCl₂,
Ph₂Si(6-Me-4-Ph-1,2,3,5-tetrahydro-s-indacen-7-yl)₂ZrCl₂,
Ph₂Si(6,8-Me2-4-Ph-1,2,3,5-tetrahydro-s-indacen-7-yl)₂ZrCl₂,
Me₂Si(6-Me-4-(2-(5-methylthiophenyl))-1,2,3,5-tetrahydro-s-indacen-7-yl)(6-Me-4-Ph-1,2,3,5-tetrahydro-s-indacen-7-yl)ZrCl₂
Me₂Si(6,8-Me2-4-Ph-1,2,3,5-tetrahydro-s-indacen-7-yl)(6-Me-4-(4-t-BuPh)-1,2,3,5-tetrahydro-s-indacen-7-yl)ZrCl₂
and their correspondent dimethyl derivatives.

The process of the present invention is preferably carried out at a temperature ranging from 60° C. to 200° C., more preferably at a temperature ranging from 70° C. to 150° C., even more preferably from 80° C. to 120° C.

The alumoxanes used in the process according to the invention are considered to be linear, branched or cyclic compounds containing at least one group of the type:

wherein the substituents U, same or different, are defined above.

In particular, alumoxanes of the formula:

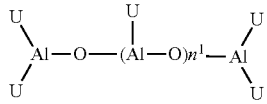

can be used in the case of linear compounds, wherein n¹ is 0 or an integer of from 1 to 40 and the substituents U are defined as above; or alumoxanes of the formula:

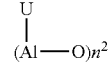

can be used in the case of cyclic compounds, wherein n² is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion F is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammonium tetrakis(pentafluorophenyl)aluminate,
Tributylammonium tetrakis(trifluoromethylphenyl)borate,
Tributylammonium tetrakis(4-fluorophenyl)borate,
N,N-Dimethylbenzylammonium-tetrakis(pentafluorophenyl)borate,
N,N-Dimethylhexylamonium-tetrakis(pentafluorophenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakis(pentafluorophenyl)borate,
N,N-Dimethylhexylamonium-tetrakis(pentafluorophenyl)borate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764.

Organic aluminum compounds used as compound c) are those of formula $H_jAlU_{3-j}$ or $H_jAl_2U_{6-j}$ as described above.

The catalyst system of the present invention can be prepared by contacting the metallocene of formula (I) and a suitable cocatalyst, in a solvent. The cocatalyst is preferably the reaction product of methylalumoxane and triisobutylaluminum.

The catalyst of the present invention can be preferably prepared according to PCT/EP2005/002479 both by distilling off toluene or by following the described procedure but without such a distillation. The catalysts of the present invention can also be supported on an inert carrier. This is achieved by depositing the metallocene compound a) or the product of the reaction thereof with the component b), or the component b) and then the metallocene compound a) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the above-mentioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The support materials used preferably have a specific surface area in the range from 10 to 1 000 $m^2/g$, a pore volume in the range from 0.1 to 5 ml/g and a mean particle size of from 1 to 500 µm. Preference is given to supports having a specific surface area in the range from 50 to 500 $m^2/g$, a pore volume in the range from 0.5 to 3.5 ml/g and a mean particle size in the range from 5 to 350 µm. Particular preference is given to supports having a specific surface area in the range from 200 to 400 $m^2/g$, a pore volume in the range from 0.8 to 3.0 ml/g and a mean particle size of from 10 to 300 µm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1 000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene)

can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example carboxylic or hydroxy groups, at least one of the catalyst components can be immobilized. The solid compound obtained by supporting the catalyst system object of the present invention on a carrier in combination with the further addition of the alkylaluminium compound either as such or prereacted with water if necessary.

In a preferred embodiment the polymerization process of the present invention is carried out in solution.

For the purpose of the present invention the term solution polymerization means that the polymer is fully soluble in the polymerization medium at the polymerization temperature used, and in a concentration range of at least 5% by weight; preferably from 5 to 50% by weight.

In order to have the polymer completely soluble in the polymerization medium, a mixtures of monomers in the presence of an inert solvent can be used. This solvent can be an aliphatic or cycloaliphatic hydrocarbon such as butane, hexane, heptane isooctane, cyclohexane and methylcyclohexane. It is also possible to use mineral spirit or a hydrogenated diesel oil fraction. Also aromatic hydrocarbons can be used such as toluene. Preferred solvents to be used are cyclohexane and methylcyclohexane. The propylene content in the mixture can be varied according to the final comonomer content wished in the copolymer and the relative reactivity ratio of the comonomers. The ethylene content in the liquid phase of the polymerization medium preferably ranges from 1 to 10% by weight; more preferably from 2 to 8% by weight.

The ratio of the comonomers varies accordingly, depending on the wished final copolymer and the relative comonomers reactivity ratio of the catalyst system.

The skilled man is able to select the ratio of ethylene and comonomer in order to obtain the whished copolymer.

The copolymers obtained according to the process of the present invention, especially those having high propylene content, can be very sticky, thus making it difficult to produce them in an industrial plant when the polymerization process is carried out in slurry or in gas phase because of the fouling in the reactor. On the contrary when a solution polymerization process is carried this problem is avoided.

The content of ethylene derived units in the copolymers obtained according to the present invention ranges from 71% by mol to 96% by mol, preferably the content of ethylene derived units ranges from 75% by mol to 90% by mol.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds a polymer endowed with a broad melting is produced.

The polymer obtained according to the process of the present invention can further contain up to 10% by mol of a non conjugated diene. Non conjugated dienes can be a straight chain, branched chain or cyclic hydrocarbon diene having from 6 to 20 carbon atoms. Examples of suitable non-conjugated dienes are:

straight chain acyclic dienes, such as 1,4-hexadiene and 1,6-octadiene;

branched chain acyclic dienes, such as 5-methyl-1,4-hexadiene, 3,7-dimethyl-1,6-octadiene, 3,7-dimethyl-1,7-octadiene and mixed isomers of dihydro myricene and dihydroocinene;

single ring alicyclic dienes, such as 1,3-cyclopentadiene, 1,4-cyclohexadiene, 1,5-cyclooctadiene and 1,5-cyclododecadiene;

multi-ring alicyclic fused and bridged ring dienes, such as tetrahydroindene, methyl tetrahydroindene, dicyclopentadiene, bicyclo-(2,2,1)-hepta-2,5-diene; and alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Preferred dienes are 1,4-hexadiene (HD), 5-ethylidene-2-norbornene (ENB), 5-vinylidene-2-norbornene (VNB), 5-methylene-2-norbornene (MNB) and dicyclopentadiene (DCPD). Particularly preferred dienes are 5-ethylidene-2-norbornene (ENB) and 1,4-hexadiene (HD). When present the non-conjugated dienes are preferably incorporated into the polymer in an amount from 0.1% to about 10% by mol, preferably from 0.2% to 5% by mol, and more preferably from 0.3% to 3% by mol. If desired, more than one diene may be incorporated simultaneously, for example HD and ENB, with total diene incorporation within the limits specified above.

Therefore a further object of the present invention is a polymerization process comprising contacting under polymerization conditions ethylene, propylene and a non conjugated diene, in the presence of a catalyst system obtainable by contacting:

b) at least a metallocene compound of formula (I)

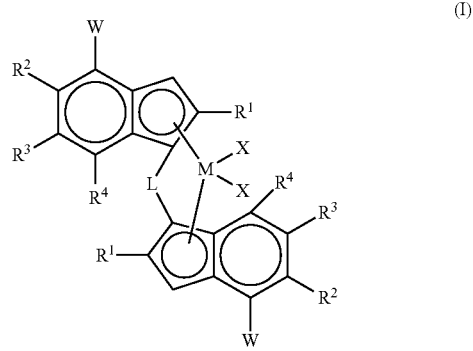

(I)

b) alumoxane or a compound capable of forming an alkyl metallocene cation; and optionally c) an organo aluminum compound.

Preferably the process is carried out in solution.

The following examples are given to illustrate and not to limit the invention.

EXAMPLES

General Characterization
Intrinsic Viscosity (IV) in Tetrahydronaphthalene

The measurement were done in tetrahydronaphthalene (THN) solution obtained by dissolving the polymer at 135° C. for 1 hour.

$^{13}$C-NMR Analysis of Ethylene-Propylene Copolymers

The polymer microstructure was investigated by $^{13}$C-NMR analysis. The samples were dissolved with a 8% wt/v concentration in 1,1,2,2-tetrachloroethane-d$_2$ at 120° C. The $^{13}$C-NMR spectra were acquired at 120° C. on a Bruker DPX400 spectrometer operating at 100.61 MHz. Each spectrum was acquired with a 90° pulse, and 12 seconds of delay between pulses and CPD (WALTZ 16) to remove $^1$H-$^{13}$C coupling. About 1500 transients were stored in 32K data points using a spectral window of 6000 Hz.

The assignments of the peaks for ethylene-propylene copolymers were made according to J. C. Randall, Macromol. Chem Phys. 1989, C29, 201 and Tritto, Z. Fan, P. Locatelli, M. Sacchi, I. Camurati, M. Galimberti, Macromolecules 1995, 28, 3342 and the triad distribution and copolymer compositions were determined according to the method proposed by M. Kakugo, Y. Naito, K. Mizunuma, T. Miyatake, Macromolecules 1982, 15, 1150 (taking into account peak overlapping).

For ethylene-propylene copolymers, the S$_{\delta\delta}$ peak at 29.9 ppm (nomenclature according to C. J. Carman, R. A. Harrington, C. E. Wilkes, Macromolecules 1977, 10, 535) was used as internal reference.

The product of reactivity ratios r$_1$·r$_2$ was calculated from the triads according to C. J. Carman, R. A. Harrington, C. E. Wilkes, Macromolecules 1977, 10, 535.

Chemicals and Characterization.

All chemicals were handled using standard Schlenk techniques.

Methylalumoxane (MAO) was received from Albemarle as a 30% wt/wt toluene solution and used as such.

Racemic-dimethylsilylbis(2-methyl-4-(4-tert-butyl-phenyl)-inden-1-yl)dichlorozirconium C-1 was prepared according to WO 98/40331 (example 65); racemic-dimethylsilylbis(2-methyl-4-(4-tert-butylphenyl)-1,5,6,7-tetrahydro-s-indacen-1-yl)dichlorozirconium A-1 was prepared according to the procedure described in EP05102189.7.

Catalyst Systems
Preparation of the Catalyst Systems.
Catalyst System S1

2700 g of TIBA/isododecane solution (90 g/L) and 670 mL of MAO/toluene solution were mixed in a 12 L thermostated autoclave. After 1 h of stirring at 50° C., 6.57 g of A-1 (previously suspended in 50 mL of toluene) were added to the MAO/TIBA solution. The resulting mixture was stirred for additional 45 min at room temperature, then 4400 g of isodecane were added and after additional 10 min stirring, the mixture was filtered to finally give an orange solution (concentration=53 g$_{TOT}$/L and 0.65 g$_{metallocene}$/L, MAO/TIBA=1.99 molar, Al$_{TOT}$/Zr=629 molar, based on the elemental analysis of the catalytic solution).

Catalyst System S2

900 g of TIBA/cyclohexane solution (332 g/L), 1070 mL of MAO/toluene solution and 1600 g of cyclohexane were mixed in a 12 L thermostated autoclave. After 1 h of stirring at 50° C., 9.67 g of A-1 (previously suspended in 60 mL of toluene) were added to the MAO/TIBA solution. The resulting mixture was stirred for additional 90 min at 50° C., then 4400 g of cyclohexane were added and after additional 10 min stirring, the mixture was filtered to finally give a red solution (concentration=76 g$_{TOT}$/L and 0.97 g$_{metallocene}$/L, MAO/TIBA=2.57 molar, Al$_{TOT}$/Zr=585 molar, based on the elemental analysis of the catalytic solution).

Catalyst System CS3

13.5 mL of TIBA/cyclohexane solution (113 g/L) were mixed with 3.2 mL of MAO/toluene solution to obtain a MAO/TIBA molar ratio of 2:1. The solution was stirred for 1 h at room temperature and transferred into a 50 mL Schlenk flask containing C-1 (28.4 mg, 38.3 µmol). The final solution was diluted with 7.7 mL of cyclohexane. Final mixture concentration=100 g$_{TOT}$/L and 1.165 g$_{metallocene}$/L; color=dark red solution.

Catalyst System S4

18.2 mL of TIBA/cyclohexane solution (99 g/L) were mixed with 3.8 mL of MAO/toluene solution to obtain a MAO/TIBA molar ratio of 2:1. The solution was stirred for 1 h at room temperature and transferred into a 50 mL Schlenk flask containing A-1 (37.3 mg, 45.4 µmol). The final solution was diluted with 35.9 mL of cyclohexane. Final mixture concentration=50 g$_{TOT}$/L and 0.645 g$_{metallocene}$/L; color=orange solution.

Polymerization Tests.

The amount of monomers (respectively C$_1$ and C$_2$) and solvent initially charged into the autoclave, and the ratio of the two monomers constantly fed during the test were calculated via ASPEN ONE simulation, based on the desired composition for the final copolymer and on the reactivity ratio R of a given metallocene:

$$R = \frac{\left(\frac{C_1}{C_2}\right)_{polymer}}{\left(\frac{C_1}{C_2}\right)_{liquidphase}} = \frac{F}{f}$$

Ethylene-Propylene Copolymerization Tests

Example 1

A 4.4 L jacketed stainless-steel autoclave, equipped with a mechanical stirrer and a 50-mL stainless-steel vial, was purified by washing with an Al(i-Bu)$_3$ solution in hexane and dried at 70° C. in a stream of nitrogen.

11.9 mL of a 100 g/L Al(i-Bu)$_3$/hexane solution (corresponding to 6 mmol of Al(i-Bu)$_3$), 1000 g of cyclohexane, 84 g of ethylene, and 181 g of propylene were charged into the autoclave, and heated to 100° C., thus producing a liquid composition of 15/85 (wt/wt) monomers/cyclohexane, and a pressure of 22 bar-g. 300 normal mL of hydrogen were charged through a stainless-steel cylinder equipped with a pressure gauge and connected to the autoclave.

1 mL of the catalyst system S1 containing the catalyst/cocatalyst mixture (0.65 mg metallocene/mL solution) was diluted with 5 mL of cyclohexane, charged in the stainless-steel vial and injected into the autoclave by nitrogen overpressure.

A constant ethylene/propylene mixture 50/50% wt was continuously fed for 30 minutes to maintain the pressure at 22 bar-g for a total consumption of 27.9 g of ethylene and 27.9 g of propylene.

The autoclave was pressurized with nitrogen up to 30 bar, the bottom discharge valve opened and the polymer discharged into a heated steel tank and treated for 10 min with water steam. The tank heating was switched off and a flow of nitrogen at 0.5 bar-g was fed to remove the water. The steel tank was finally opened, the wet polymer collected, and dried overnight under reduced pressure at 70° C. The results from the analysis performed on the polymer samples are reported in Table 1.

Example 2

The procedure of example 1 was repeated feeding 1000 g of cyclohexane, 110.6 g of ethylene, and 161 g of propylene in order to obtain, at 100° C. and 27 bar-g, a liquid composition of 15/85% wt monomers/cyclohexane.

1 mL of the catalyst system S1 containing the catalyst/cocatalyst mixture (0.65 mg metallocene/mL solution) was diluted with 5 mL of cyclohexane, charged in the stainless-steel vial and injected into the autoclave by nitrogen overpressure.

A constant ethylene/propylene mixture 60/40% wt was continuously fed for 30 minutes to maintain the pressure of 27 bar-g: 25.5 g of ethylene and 17.3 g of propylene were consumed. The results from the analysis performed on the polymer samples are reported in Table 1.

Example 3

The procedure of example 1 was repeated feeding 1000 g of cyclohexane, 112 g of ethylene, and 160 g of propylene in order to obtain, at 100° C. and 28 bar-g, a liquid composition of 15/85% wt monomers/cyclohexane. 300 normal mL of hydrogen were charged in the autoclave.

0.9 mL of the catalyst system S2 containing the catalyst/cocatalyst mixture (0.97 mg metallocene/mL solution) were diluted with 5 mL of cyclohexane, charged in the stainless-steel vial and injected into the autoclave by nitrogen overpressure.

A constant ethylene/propylene mixture 70/30% wt was continuously fed for 30 minutes to maintain the pressure of 28 bar-g: 86.2 g of ethylene and 37.5 g of propylene were consumed. The results from the analysis performed on the polymer samples are reported in Table 1.

Example 4

The procedure of example 3 was repeated feeding the same amount of monomers and solvent, but using 0.7 mL of the catalyst system S2 and 200 normal mL of hydrogen.

A constant ethylene/propylene mixture 70/30% wt was continuously fed for 30 minutes to maintain the pressure of 28 bar-g: 70.5 g of ethylene and 30.2 g of propylene were consumed. The results from the analysis performed on the polymer samples are reported in Table 1.

Example 5

The procedure of example 3 was repeated feeding the same amount of monomers and solvent, but using 0.6 mL of the catalyst system S2 and 400 normal mL of hydrogen.

A constant ethylene/propylene mixture 70/30% wt was continuously fed for 30 minutes to maintain the pressure of 28 bar-g: 88.6 g of ethylene and 37.3 g of propylene were Table 1.

Example 6

The procedure of experiment example 3 was repeated feeding the same amount of monomers and solvent, but using 0.4 mL of the catalyst system S2 and 600 normal mL of hydrogen.

A constant ethylene/propylene mixture 70/30% wt was continuously fed for 30 minutes to maintain the pressure of 28 bar-g: 68.9 g of ethylene and 29.8 g of propylene were consumed. The results from the analysis performed on the polymer samples are reported in Table 1.

Example 7

The procedure of example 1 was repeated feeding 945 g of cyclohexane, 118 g of ethylene, and 172 g of propylene in order to obtain, at 100° C. and 31 bar-g, a liquid composition of 18/82% wt monomers/cyclohexane. 200 normal mL of hydrogen were charged in the autoclave.

0.4 mL of the catalyst system S1 containing the catalyst/cocatalyst mixture (0.97 mg metallocene/mL solution) were diluted with 5 mL of cyclohexane, charged in the stainless-steel vial and injected into the autoclave by nitrogen overpressure.

A constant ethylene/propylene mixture 70/30% wt was continuously fed for 30 minutes to maintain the pressure of 31 bar-g: 59 g of ethylene and 25 g of propylene were consumed. The results from the analysis performed on the polymer samples are reported in Table 1.

Example 8

The procedure of example 1 was repeated feeding 940 g of cyclohexane, 128 g of ethylene, and 164 g of propylene in order to obtain, at 100° C. and 31 bar-g, a liquid composition of 18/82% wt monomers/cyclohexane. 200 normal mL of hydrogen were charged in the autoclave.

0.6 mL of the catalyst system S4 containing the catalyst/cocatalyst mixture (0.645 mg metallocene/mL solution) were diluted with 5 mL of cyclohexane, charged in the stainless-steel vial and injected into the autoclave by nitrogen overpressure.

A constant ethylene/propylene mixture 70/30% wt was continuously fed for 30 minutes to maintain the pressure of 31 bar-g: 59.7 g of ethylene and 25.4 g of propylene were consumed. The results from the analysis performed on the polymer samples are reported in Table 1.

Comparative Example 9

The procedure of example 1 was repeated feeding 1000 g of cyclohexane, 142.5 g of ethylene, and 137 g of propylene in order to obtain, at 100° C. and 33 bar-g, a liquid composition of 15/85% wt monomers/cyclohexane.

3 mL of the catalyst system CS3 containing the catalyst/cocatalyst mixture (1.165 mg metallocene/mL solution) were diluted with 5 mL of cyclohexane, charged in the stainless-steel vial and injected into the autoclave by nitrogen overpressure.

A constant ethylene/propylene mixture 70/30% wt was continuously fed for 30 minutes to maintain the pressure of 33 bar-g: 48 g of ethylene and 20.9 g of propylene were consumed. The results from the analysis performed on the polymer samples are reported in Table 1

TABLE 1

| Ex. | Yield (g) | $kg_{POL}/(g_{MC} * 30')$ | I.V. (dL/g, THN) | Ethylene content NMR (% mol) | $r_1 r_2$ |
|---|---|---|---|---|---|
| 1 | 111 | 172.4 | 2.70 | 76 | 1.70 |
| 2 | 125 | 198.5 | 2.63 | 82 | 1.57 |
| 3 | 140 | 160.8 | 2.17 | 76 | 1.99 |

TABLE 1-continued

| Ex. | Yield (g) | kg$_{POL}$/ (g$_{MC}$ * 30') | I.V. (dL/g, THN) | Ethylene content NMR (% mol) | r$_1$r$_2$ |
|---|---|---|---|---|---|
| 4 | 127 | 187.5 | 2.46 | 78 | 1.95 |
| 5 | 143 | 245.0 | 2.04 | 75 | 1.91 |
| 6 | 132 | 341.4 | 1.66 | 77 | 1.90 |
| 7 | 138 | 356.5 | 2.35 | 75 | 2.48 |
| 8 | 134 | 345.5 | 2.67 | 77 | 1.97 |
| 9* | 72 | 20.6 | 1.88 | 75 | 2.09 |

*= Comparative
$_{MC}$ = metallocene compound

The invention claimed is:

1. A polymerization process comprising contacting under polymerization conditions ethylene and propylene to obtain an ethylene-propylene copolymer comprising from 96% by mol to 71% by mol of ethylene derived units in presence of a catalyst system obtained by contacting:

a) at least a metallocene compound of formula (I)

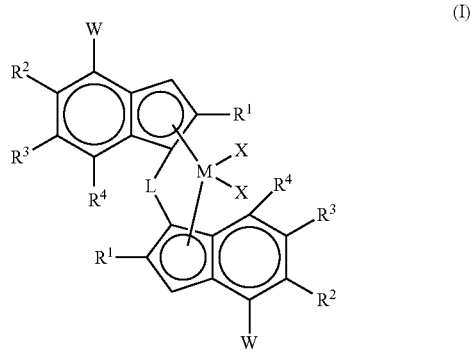

(I)

and b) alumoxane or a compound capable of forming an alkyl metallocene cation;

wherein:

M is an atom of a transition metal selected from group 3, 4, or the lanthanide or actinide groups in the Periodic Table of Elements;

X equal to or different from each other, is hydrogen, halogen, R, OR, OR'O, OSO$_2$CF$_3$, OCOR, SR, NR$_2$ or PR$_2$;

R is a linear or branched, cyclic or acyclic, C$_1$-C$_{40}$-alkyl, C$_2$-C$_{40}$ alkenyl, C$_2$-C$_{40}$alkynyl, C$_6$-C$_{40}$-aryl, C$_7$-C$_{40}$-alkylaryl or C$_7$-C$_{40}$-arylalkyl radical, optionally comprising at least one heteroatom belonging to groups 13-17 of the Periodic Table of Elements;

R' is a C$_1$-C$_{20}$-alkylidene, C$_6$-C$_{20}$-arylidene, C$_7$-C$_{20}$-alkylarylidene, or C$_7$-C$_{20}$-arylalkylidene radical;

L is a divalent bridging group selected from C$_1$-C$_{20}$ alkylidene, C$_3$-C$_{20}$ cycloalkylidene, C$_6$-C$_{20}$ arylidene, C$_7$-C$_{20}$ alkylarylidene, or C$_7$-C$_{20}$ arylalkylidene radicals, optionally comprising at least one heteroatom belonging to groups 13-17 of the Periodic Table of Elements, or a silylidene radical comprising up to 5 silicon atoms;

R$^1$ is a linear C$_1$-C$_{40}$ hydrocarbon radical optionally comprising at least one heteroatom belonging to groups 13-17 of the Periodic Table of Elements;

R$_2$ and R$_3$ are part of 4-7 membered ring condensed to the benzene ring of the indenyl moiety, said ring optionally comprising at least one heteroatom belonging to groups 13-16 of the Periodic Table of Elements, wherein the valence of each atom forming the ring being filled with R$^{18}$ radicals;

R$^{18}$ equal to or different from each other, are hydrogen or C$_1$-C$_{40}$ hydrocarbon radicals;

R$^4$ is hydrogen;

W is an aromatic 5 or 6 membered ring optionally comprising at least one heteroatom belonging to groups 13-16 of the Periodic Table of Elements, wherein the valence of each atom of the ring is substituted with hydrogen or is optionally substituted with at least one R$^5$ group; and R$^5$ equal to or different from each other, are C$_1$-C$_{40}$ hydrocarbon radicals optionally comprising at least one heteroatom belonging to groups 13-17 of the Periodic Table of Elements.

2. The process according to claim 1, wherein R$^1$ is selected from methyl, ethyl, an alpha branched aryl, and an arylalkyl radical comprising from 2 to 20 carbon atoms and optionally comprising O, N, S, P or Se atoms.

3. The process according to claim 1, wherein the catalyst system further comprises c) an organo aluminum compound.

4. The process according to claim 1, wherein
M is zirconium, titanium or hafnium;
X is hydrogen, halogen, OR'O, or R;
L is Si(R$^{11}$)$_2$;
R$^{11}$is a linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radical; and
R$^1$ is a C$_1$-C$_{10}$-alkyl radical.

5. The process according to claim 1, wherein R$^2$ and R$^3$ are part of 5-6 membered ring condensed to the benzene ring of the indenyl moiety, the ring being substituted with R$^{18}$ radicals; wherein R$^{18}$ is hydrogen or a linear or branched, C$_1$-C$_{20}$-alkyl radical.

6. The process according to claim 1, wherein W is selected from the group consisting of the following moieties of formula (Wa), (Wb) and (Wc):

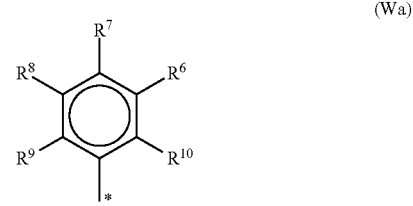

wherein the * represents the point in which the moiety is bound to the indenyl moiety of the compound of formula (I);

R$^6$, R$^7$, R$^8$, R$^9$ and R$^{10}$, equal to or different from each other, are hydrogen or C$_1$-C$_{40}$ hydrocarbon radicals optionally comprising at least one heteroatom belonging to groups 13-17 of the Periodic Table of Elements;

$Z^1$ is nitrogen or a $CR^{10}$ group;
$Z^2$ is nitrogen or a $CR^6$ group;
$Z^3$ is nitrogen or a $CR^7$ group;
$Z^4$ is nitrogen or a $CR^8$ group;
$Z^5$ is nitrogen or a $CR^9$ group, with the proviso that not more than 2 groups among $Z^1$, $Z^2$, $Z^3$, $Z^4$ and $Z^5$ are nitrogen atoms;
$Z^6$ is oxygen, sulfur, a $NR^{13}$ group or a $CR^{13}$ group;
$Z^7$ is oxygen, sulfur, a $NR^{14}$ group or a $CR^{14}$ group;
$Z^8$ is oxygen, sulfur, a $NR^{15}$ group or a $CR^{15}$ group;
$Z^9$ is oxygen, sulfur, a $NR^{16}$ group or a $CR^{16}$ group;
$z^{10}$ is nitrogen or carbon, with the proviso that not more than 1 group among $Z^6$, $Z^7$, $Z^8$, $Z^9$ or $Z^{10}$ sulfur, oxygen, or a nitrogen-containing group atom selected from nitrogen, $NR^{13}$, $NR^{14}$, $NR^{15}$, and $NR^{16}$; and
$R^{13}$, $R^{14}$, $R^{15}$ and $R^{16}$, equal to or different from each other, are hydrogen or $C_1$-$C_{40}$ hydrocarbon radicals optionally comprising at least one heteroatom belonging to groups 13-17 of the Periodic Table of Elements.

7. The process according to claim 1, wherein the compound of formula (I) comprises formula (IIa), (IIb) or (IIc):

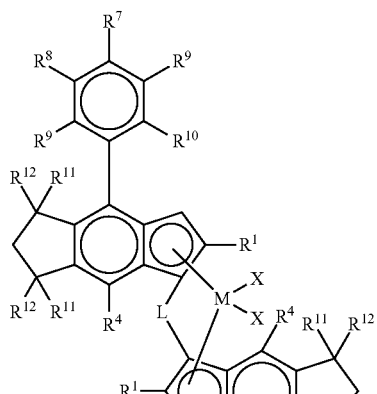

(IIa)

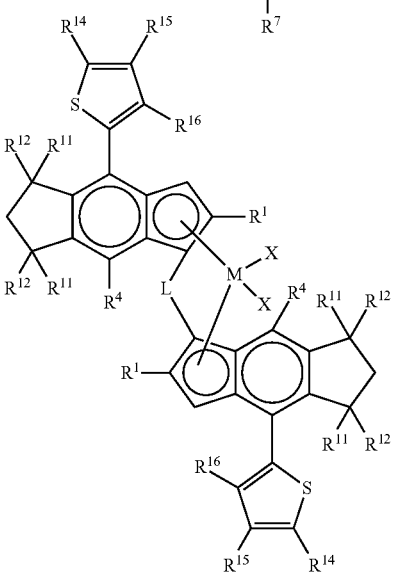

(IIb)

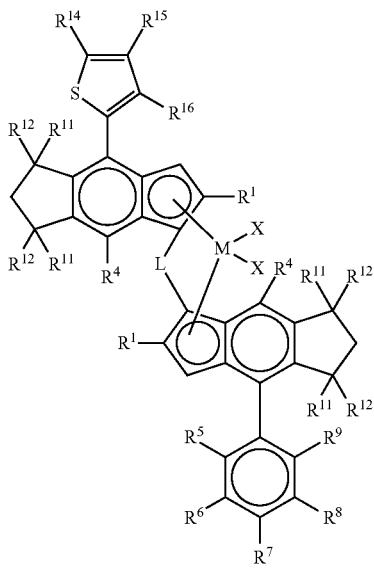

(IIc)

wherein

M is an atom of a transition metal selected from group 3, 4, or the lanthanide or actinide groups in the Periodic Table of Elements;

X equal to or different from each other, is hydrogen, halogen, R, OR, OR'O, $OSO_2CF_3$, OCOR, SR, $NR_2$ or $PR_2$;

R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally comprising at least one heteroatom belonging to groups 13-17 of the Periodic Table of Elements;

R' is a $C_1$-$C_{20}$-alkylidene, $C_6$-$C_{20}$-arylidene, $C_7$-$C_{20}$-alkylarylidene, or $C_7$-$C_{20}$-arylalkylidene radical;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals, optionally comprising at least one heteroatom belonging to groups 13-17 of the Periodic Table of Elements, or a silylidene radical comprising up to 5 silicon atoms;

$R^1$ is a linear $C_1$-$C_{40}$ hydrocarbon radical optionally comprising at least one heteroatom belonging to groups 13-17 of the Periodic Table of Elements;

$R^4$ is hydrogen;

$R^5$ is a $C_1$-$C_{40}$ hydrocarbon radical optionally comprising at least one heteroatom belonging to groups 13-17 of the Periodic Table of Elements;

$R^6$, $R^7$, $R^8$, $R^9$ and $R^{10}$, equal to or different from each other, are hydrogen or $C_1$-$C_{40}$ hydrocarbon radicals optionally comprising at least one heteroatom belonging to groups 13-17 of the Periodic Table of Elements;

$R^{14}$, $R^{15}$ and $R^{16}$, equal to or different from each other, are hydrogen or $C_1$-$C_{40}$ hydrocarbon radicals optionally comprising at least one heteroatom belonging to groups 13-17 of the Periodic Table of Elements; and $R^{11}$ and $R^{12}$ equal to or different from each other, are hydrogen or $C_1$-$C_{40}$ hydrocarbon radicals optionally comprising at least one heteroatom belonging to groups 13-17 of the Periodic Table of Elements.

8. The process according to claim 1, wherein the process is carried out at a temperature ranging from 60° C. to 200° C.

9. The process according to claim 1, wherein the copolymer comprises from 75% by mol to 90% by mol of ethylene derived units.

10. The process according to claim 1, wherein the process is carried out in solution.

* * * * *